Nov. 10, 1936.       J. A. V. TURCK         2,060,704
                    CALCULATING MACHINE
            Original Filed May 7, 1926    4 Sheets-Sheet 1

Inventor
JOSEPH A. V. TURCK.
By
Henry Loor Clarke
          Attorney

Nov. 10, 1936.   J. A. V. TURCK   2,060,704
CALCULATING MACHINE
Original Filed May 7, 1926   4 Sheets-Sheet 3

Inventor
JOSEPH A. V. TURCK
By Henry Low Clarke
his Attorney

Nov. 10, 1936.    J. A. V. TURCK    2,060,704
CALCULATING MACHINE
Original Filed May 7, 1926    4 Sheets-Sheet 4

Inventor
JOSEPH A. V. TURCK.

By
Henry Loor Clarke
his Attorney

Patented Nov. 10, 1936

2,060,704

UNITED STATES PATENT OFFICE 2,060,704

CALCULATING MACHINE

Joseph A. V. Turck, Wilmette, Ill., assignor to Felt & Tarrant Manufacturing Company, Chicago, Ill., a corporation of Illinois Original application May 7, 1926, Serial No. 107,527. Divided and this application July 1, 1932, Serial No. 620,507

3 Claims. (Cl. 235—144)

This invention relates in general to improvements in calculating machines and more particularly to improvements in calculating machines alternatively operable by individual key, or by key-set power drive. The present invention relates especially to the improvements in zeroizing means for such machines disclosed in my parent copending applications Ser. No. 654,874 filed July 31, 1923 (now Patent 1,869,872) and Ser. No. 107,527 filed May 7, 1926 (now Patent 1,926,826), of which this application is a division of the latter and a continuation in part of the former.

Objects of the present invention are the provision of a novel zeroizing mechanism suitable for zeroizing an accumulator mechanism particularly adapted for alternatively key-driven operation or key-set universal actuation in a shiftable accumulator carriage; the provision of a zeroizing mechanism for an accumulator register mechanism and a counter register mechanism whereby the counter register may be zeroized independently of accumulator register zeroization or together with zeroization of the latter register.

In addition to the general objects recited above the invention has for further objects such other improvements or advantages in construction and operation as may be found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:—

As the present improvements are useful with various types of calculating machines and as the details of the present invention may be readily understood by reference to my parent applications aforesaid, which are made a part hereof, a brief description of the various parts of the machine as are concerned with the present improvements will suffice for an understanding of the same. The same reference characters used in my aforesaid application Ser. No. 107,527 now Patent 1,926,826 will be used herein to indicate the same parts. Figures 1 to 8 are identical copies of Figures 1, 8, 10, 13, 25, 26, 27 and 28 respectively, of my aforesaid application Ser. No. 107,527.

The various instrumentalities, which constitute the actuating mechanism from which calculative motion is transmitted to the accumulator mechanism, are supported by a frame mounted on a base 21 of an enclosing casing, said frame consisting of side skeleton plates and intermediate skeleton plates 23 disposed between the various actuating mechanisms of the several orders of the machine, and all tied together at suitable points by transverse tie rods 24. The various orders of the actuating mechanism are "stationary", i. e., there is no shift from order to order of the actuating mechanism. In performing multiple-stroke key-set universal-key-driven calculation, shifting is effected by the carriage which supports the accumulator-mechanism, as hereinafter described.

According to the present type of machine, a number of columns of nine keys each are provided, a column for each order of the machine. Each column of keys 25 corresponds with the column actuator and attendant parts and constitutes a mechanism either for driving the column actuator an amount proportionate to the digital value of the particular key operated or for setting and controlling the column actuator to be otherwise driven a like amount. The keys of each column are numbered from "1" to "9" and complementally for negative calculation from "0" to "8" in front to rear order of the machine; the key at the extreme front is adapted to effect or otherwise to control operation of the column actuator through an arc substantially one-ninth of that produced by the operation of the key at the extreme rear of the machine, and upon depression of intermedially positioned keys, the column actuator is or may be moved through various arcs respectively determined by the digital value of the intermediate keys depressed.

Each key 25 is provided with a stem 26 extending down and bearing upon the corresponding column actuator 29 for key-driven actuation of the machine. Spring mechanisms 28 similar to those employed in the well known comptometer are utilized for the purpose of restoring the respective keys 25 to normal independently of the column actuator.

There is a column actuator 29 for each column of nine keys of the machine, and each column actuator is preferably constructed in the form of a bell-crank lever having a long, horizontal arm 29, a relatively short depending vertical arm 30, and being pivoted at the junction point of said arms to the framework at the rear of the machine, as shown at 31. The horizontal arm 29 of the column actuator extends forwardly from rear to front of the machine and receives the key-impulse to actuate the accumulator, when the machine is set for key-driven actuation. Pivoted at 32 on a fixed shaft extending through and supported by the framework of the machine is an actuator sector 33 for transmitting the calculative motion of the column actuator to the accumulator. The pivoted sector 33 is provided with a set of gear teeth 34 on its arcuate periphery and said teeth are adapted to mesh with ordinal gears forming part of the ratchet mechanisms. Motion produced by the normal movement of the column actuator is transmitted to the pivoted sector 33 by an abutment 35 at the end of a double-arm lever 35a pivoted on the hub of the sector 33 concentrically with shaft 32 and connected with the column actuator by a link 35b. The abutment 35 is normally held in engagement with the rear radial edge 36 of the sector by a spring 37 connecting the forward radial arm 38 of said sector with said abutment 35. So long as any key 25 is depressed only that amount necessary to effect a movement of the sector 33 correspondingly with the digital value of the key, the spring 37, during the downward movement of the column actuator arm 29, will hold the sector 33 against the abutment 35. If, however, the key be depressed beyond such normal movement the spring 37 will permit the abutment 35 to move, with a yielding action, away from the sector 33 as the column actuator arm 29 continues to move downwardly.

In key-driven actuation, the column actuators are restored to normal, i. e., the horizontal arms 29 of said actuators are lifted, respectively by the key-arm-driven functioning member of the corresponding dual flexible link mechanism. This mechanism is a very important factor of the present machine. It provides for restoring the column actuators to normal in key-driven actuation, relieves the column actuators from the stress of such power in key-set universal-key-driven actuation, and yet provides, during universal-key-driven actuation, a yielding connection between the column actuator and the universal actuator, permitting a constant movement of the universal actuator in all orders to take place coincidently with a variable movement of the column actuators, or no movement at all of said column actuators as determined by the key-setting. It also forms a flexible connection for both depressing and restoring the column actuators to normal in universal-key-driven actuation. Further important features of the dual flexible link mechanism will be developed in the description of the key-set universal-key-driven operation of the machine.

The universal actuator 39 functions as an abutment for causing the spring-tensioning that effects the return movement of the column actuators in key-driven actuation. It comprises a universal-key-driven oscillatory shaft 40 extending transversely of the main frame. Fixed to said shaft 40 so as to partake of its oscillatory movement are the universal actuator plate members 41 which correspond ordinally with the column actuators 29. It is particularly these plate members 41 which constitute the abutments for the spring tensioning hereinafter referred to.

The dual flexible link mechanism of each column actuator and corresponding universal actuator plate comprises an upper link mechanism 42 and a lower link mechanism 43.

The said lower flexible link mechanism 43 includes a horizontally disposed coil spring 44 connected at its rear end to the stud 45 at the lower end of the vertical arm 30 of the column actuator. Within the spring 44 is a ram 46 having a head 47 which projects beyond the forward end of the spring 44. The forward end of the spring is secured to the head 47. In length the ram 46 is so proportioned relatively to the spring 44, that, when the rear end of the ram touches the abutment 45, the column actuator is relieved from such spring tension. As shown the head 47 is provided with a slot 48 extending parallel with the ram body 46 and the forward end of the ram is slidably attached to the lower end of the corresponding universal actuator plate 41 by a stud 49 secured to said plate, which projects transversely through said slot 48. The upper flexible link mechanism 42 of each order is constituted of parts similar to those of the lower mechanism 43 but is somewhat less in length. The spring 50 is secured at its upper end, at 51, to a stud located near the rear end of the horizontal column actuator arm 29, and said spring 50 inclines forwardly and downwardly toward the upper part of the universal actuator plate 41, being secured to the head 53 of the ram 52 which has a slidable connection with the plate 41 by the stud 55 which projects through the slot 54 in the ram head.

It will be noted that the upper and lower flexible link mechanisms 42 and 43 are respectively located on opposite sides of the pivotal axes 31 and 40 of the column actuator and of the universal actuator, and both said link mechanisms have slidable connections, as hereinbefore described, with the universal actuator. These features, taken in conjunction with the construction and arrangement of the parts themselves, cause the following operation to take place during individual key-driven actuation of the machine. In such actuation, the universal actuator including all the ordinal plates 41 is stationary, being in fact locked against movement by a device hereinafter described. When the parts are at normal, the studs 49 and 55 are respectively located at the forward and lower ends of the slots in the ram heads 47 and 53. Upon depression of a numeral key 25, the horizontal column actuator moves downwardly an amount proportional with the digital value of the key depressed. This movement of the column actuator turns the transmitting gear sector 33 in a counter-clockwise direction (see Figure 2) the required amount for the incremental accumulative actuation, which occurs on the reverse clockwise rotation of the sector 33. The downward movement of the horizontal column actuator arm 29 causes a rearward movement of the depending column actuator arm 30 and this rearward movement of said arm 30 stretches or tensions the spring 44 to produce power for the return movement of the column actuator, inasmuch as the ram 46 remains stationary. In this manner the spring 44 of the flexible link mechanism functions as the return spring for the column actuator in individual key-driven actuation. Although the spring action of the upper flexible link mechanism 42 is opposed to that of the lower flexible link mechanism 43, the spring 50 of said upper mechanism is not tensioned in either the downward or return movement of the column actuator and thus interposes no resistance to the movements of the parts in individual key-driven actuation. The entire upper flexible link mechanism 42 moves bodily downward with the horizontal arm 29 of the column actuator, as shown in Figure 2, the ram head 53 with its slot 54 sliding relatively to the stud 55 on the stationary universal actuator plate.

In all forms of calculative actuation, it is the upward return movement of the transmitting gear or adding sectors 33 that effects the actual transfer of incremental ordinal accumulation to the accumulator mechanism, namely, the adding actuation. This is effected by an ordinal internal ratchet mechanism, operating in like manner in the "Comptometer" patents hereinbefore mentioned in my parent application.

Figure 2:
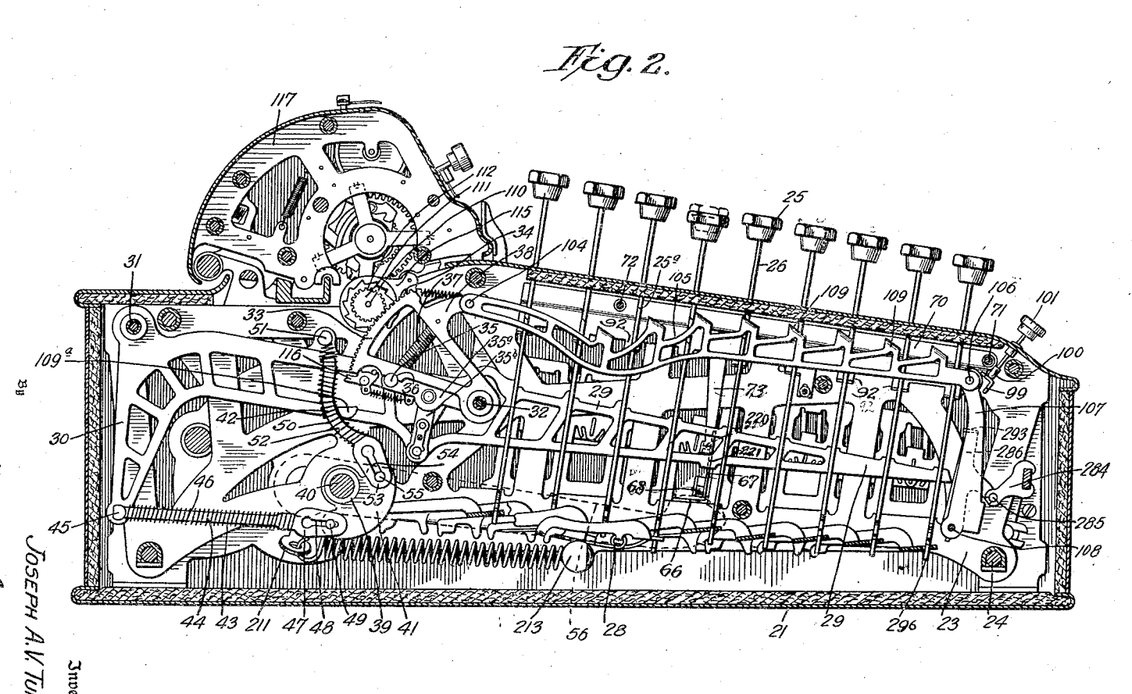
Fig. 2 is a vertical sectional view taken on the line 2—2 of Fig. 1, and showing the operation of the actuating mechanism in key-set universal-key-driven actuation of the machine.

The operation of the actuating mechanism of the machine, when performing key-set universal-key-driven calculation is illustrated in Figure 2. In such key-set universal-key-driven actuation, the depression of any ordinal numeral key merely sets the digital control and unlocks the column actuator corresponding to its order for subsequent calculative movement by the universal-key-drive mechanism, the operation of a numeral key being merely an unlocking of an ordinal locking device corresponding to the order in which the key is depressed, as contra-distinguished from an actual calculative movement produced by key operation in individual numeral key-driven actuation of the machine. When the machine is set to operate in key-set universal-key-driven actuation, the column actuators in all orders of the machine are locked against movement by an ordinal locking mechanism and only those column actuators are operated which have been released by a setting of one of the corresponding ordinal keys. The oscillatory movement of the universal actuator plates 41 is employed first to depress and then to elevate those column actuators which have been released from the ordinal locking mechanism by previous key setting.

In the present embodiment of the invention, such oscillatory movement of the universal actuator is effected by the light touch of the universal-key 56 which operates the universal actuator mechanism, as described in my application Ser. No. 107,527.

Connections, such as those described in my aforesaid copending application Ser. No. 107,527, are provided so that a mere light stroke depression of the universal-key 56 similar to that required of the numeral keys 25, will impart first a clockwise and next a counter-clockwise movement to the universal actuator shaft 40 (as in Figure 2) and the series of ordinal actuator plates 41. In other words, each single depression and elevation of the universal key is accompanied by a downward and upward oscillation of the universal actuator plates. In universal-key actuation, each single oscillation of said plates 41 effects a single incremental actuation movement of the selected column actuators.

The ordinal locking mechanism for preventing actuation of the column actuators by the universal actuator, in key-set universal key-driven operation, comprises (Fig. 2) a bar 66 which constitutes the support for the ordinal actuator locks 67. These locks are pivotally mounted on a pin 68 and their upper free ends are provided with locking notches which are projected beneath the arms 29 of the column actuators to prevent depression thereof, whenever the locks 67 are shifted to the left of the machine by setting the machine for key-set universal-key-driven operation. Each ordinal lock 67 is controlled individually by its corresponding ordinal lock control bar 70. These bars 70 extend from front to rear in the various orders of the machine and are loosely supported by front and rear rods 71 and 72, which permit the bars to be swung individually or in unison on axes parallel with their length. Each bar 70 is provided with a depending arm 73 the lower end of which is folded U-shape, to provide a pocket, by bending a portion integral with the rear edge of the arm towards the right of the machine and this portion is again bent in the direction towards the front of the machine. This pocket incloses a pin 220 secured to the lock 67 near the upper end thereof. When the lower edges of the respective bars 70 are swung in unison towards the left of the machine by the mechanism for setting the machine for key-set universal-key-driven operation, the several locks 67, through the connections 73, will be swung toward the left of the machine in a counter-clockwise direction, to move the locking notches of locks 67 into engagement with the projection 221 of the column actuator arms 29. For this purpose means are provided (such as the means disclosed in my aforesaid copending applications) comprising a control key 83 (Fig. 1), designated "individual key-drive" and a control key 88 designated "universal-key-drive" and intermediate connections whereby, when the control key 88 is depressed and the key 83 concurrently elevated, the several control bars 70 move towards the left of the machine and shift the ordinal locks 67 into locking position. When the key 83 is depressed and the key 88 concurrently elevated, the several control bars 70 and the arms 73 are shifted towards the right of the machine thereby shifting all of the locks 67 out of their locking positions. The key 83 thereby sets the machine for individual-key-driven actuation, whereas the key 88 sets the machine for universal-key-driven actuation.

As hereinbefore stated, when the machine is set for key-set universal-key-driven actuation, the depression of an ordinal numeral key 25 unlocks the ordinal lock 67 of the corresponding orders. For this purpose each control bar 70 is provided with a series constituted of nine depending projections 92 (Fig. 2) which respectively correspond to the column of nine numeral keys 25 of the corresponding order of the machine. Each numeral key 25 is provided with a projection located on the right-hand-side of its stem 26 and having a notch which receives the corresponding projection 92 of the ordinal lock control bar when the key is in normal position.

On depression of key for the key-set actuation the shoulder above the notch engages the control bar projection 92, so that the downward movement of the key causes the lower edge of the control bar to move toward the right of the machine with the result that the depending connection 73 is also shifted toward the right side of the machine to throw the ordinal lock 67 of the order corresponding with the key to inoperative position, thereby permitting the universal actuator to effect a calculative movement of the column actuator of that order. As the key 25 moves downwardly the shoulder above the notch is positioned beneath the projection 92, thereby holding the key depressed in key-set position until released either by the "key-set release" mechanism or as hereinafter described. After the keys of the various selected orders have been "set" as above described the universal actuator mechanism may be operated either for a single actuation, as in addition calculation, or for as many repeated actuations as desired, when performing multiple stroke calculation.

When the desired calculative actuation has been completed, whether single or multiple stroke, the several selected numeral keys 25, which have been set are restored to normal positions and the released column actuator locks of their respective orders are repositioned for locking the column actuators. This is accomplished by the universal-lock release mechanism or by changing to individual key-drive and then rechanging back to key-set universal-key-drive.

Figures 1, 9:
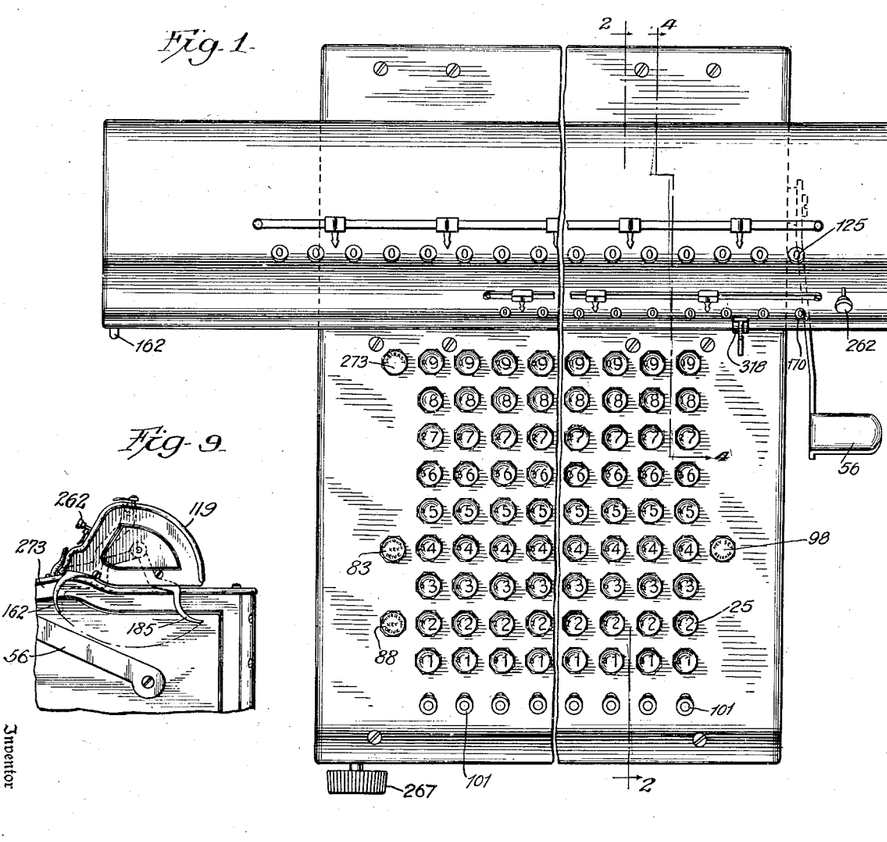
Fig. 1 is a top plan view of a calculating machine constructed in accordance with the present invention.
Fig. 9 is a side elevational view of the rear portion of the upper right hand side of the machine illustrating the handles for zeroizing and shifting the carriage.

There is also provided a columnar release mechanism employed for the individual column actuator locks 67, for example when it is desired to release either the column actuator lock of any selected column or to move the control bar 70 to its extreme releasing position, to release a numeral key 25 which has been previously "set" in that column. This columnar release mechanism may be employed for correcting an error in the key setting of any column, and permits a new key setting to be made in any column, if a key has been previously set in that column without making it necessary to release the key setting in other columns, as would happen in an operation of the "key set release" key 98 (Fig. 1).

The operation of the universal actuator, in key-set universal-key-driven actuation of the machine, is shown in Figure 2. As hereinbefore stated, each complete depression of the universal-key 56 produces first a clockwise movement and next a counter-clockwise movement of the shaft 40 and ordinal universal actuator plates 41. Those column actuators which have not been set for universal-key-driven operations are locked against movement by their corresponding column locks 67, but in the various orders in which key-setting has taken place, the respective column actuator arms 29 may move variably downwardly, in accordance with the digital value of their respective key-settings, until their motion is arrested by the digital control device hereinafter explained. The dual flexible link mechanism connecting the universal actuator plates with the column actuators in the several orders, permits the constant oscillatory motion of the plates 41 in all orders, although column actuators have been set for relatively variable movements and in some orders, as required by the example to be performed, no setting of the column actuators may have taken place at all.

Pivotally mounted at 104 on the forward arm 38 of the adding sector of each column actuator is a digital stop bar 105 which extends to the front of the machine and has its front end pivoted at 106 to the top of a rocker arm 107, the latter being pivoted on a crossrod 108. The said bar 105 is provided with a series of eight stops or projections 109 respectively corresponding to the column of digital or numeral keys of its corresponding order, with the exception of the nine key 25 and adapted to arrest the rearward movement of said bar 105 by the depression or setting of a key 25. The nine key and the movement of the sector 33 corresponding thereto represents the extreme movement of said sector, and such movement is preferably arrested by a fixed stop 109a attached to the framework.

The motion of the adding sectors 33 of the column actuators is transmitted to the accumulator mechanism by ordinal internal ratchet mechanisms, which operate on the same principle as the internal ratchet mechanisms of the standard "Comptometer" type exemplified in the prior patents hereinbefore mentioned in my copending applications aforesaid, for permitting the numeral wheel and transmitting gearing of the accumulator mechanism to remain idle during the rearward downstroke of the corresponding adding sector 33, but to be actuated to effect the accumulation during the return stroke of said sector. These ordinal ratchet mechanisms are mounted on a supporting rod or shaft that extends transversely through the stationary framework of the machine. Each ratchet mechanism includes a gear 111 in mesh with the rack teeth of the corresponding ordinal sector 33, an internal ratchet 112 comprising a hollow member having ratchet teeth facing on its inside fixed to said gear 111, a lantern wheel 113, a gear 114, fixed to said lantern wheel and adapted to mesh with an order of the accumulator mechanism, (see Figures 2, 4, 7 and 8) and the usual internal pawl inside the member 112 (not shown) interposed between the internal ratchet and the lantern wheel for clutching the lantern wheel and gear 114 to the ratchet 112 only during the return up-stroke of the corresponding adding sector. Cooperating with the lantern wheel are the usual stop devices for preventing erroneous operation, said devices including the spring actuated double armed backstops providing two pawls 115 that function as a double escapement or pallet motion mechanism, and the spring actuated actuating-stop over-throw-prevention pawl member 116.

In accordance with the invention, the accumulator mechanism is optional either stationary with respect to the several orders of the actuating mechanism (both for individual key-driven actuation or for key-set universal-key-driven actuation) or shiftable both for key-set universal-key-driven multiple stroke actuation or for individual-key-driven multiple stroke actuation. The accumulator mechanism includes the numeral wheels, and the interposed transmission gearing mechanism which receives direct incremental actuation from the column actuators and transfers it to the numeral wheels of the corresponding orders and also receives or transmits indirect actuation from a lower order gearing to a higher order gearing for effecting carrying of the tens from order to order, whenever a numeral wheel of a lower order passes the "9" point, whether in gear with the actuating mechanism or not. The carriage comprises a supporting framework including skeleton plates 117 (Figs. 2 and 4) interposed between the various orders of the accumulator and tied together by transverse tie rods 118, and a top inclosing casing 119. The carriage is both pivotally and slidably mounted on a rod 120 supported from the top of the fixed framework of the machine and is preferably constructed of a width somewhat greater than the width of the stationary casing to support a number of accumulator orders in excess of the orders of the actuating mechanism. This construction provides a machine of large capacity for multiple stroke calculation, whether positive as in multiplication or negative as in division. In the machine illustrated in the drawings there are eight columns of the actuating mechanism and fifteen columns or orders of the accumulator mechanism. Mounted on the stationary frame of the machine is a bed plate 121 provided with a series of notches or grooves 122, said grooves marking the various ordinal positions of the carriage when at rest and being adapted to co-operate with a depending lock arm 123 supported by rods 120 and 234 in the carriage which arm enters one of the grooves when the carrage has been lowered into proper registering position. The lock arm 123 is arranged between two guide plates 235 (Fig. 4) forming a housing for said arm, and a spring 236 is interposed between the upper rear end 237 of the lock arm 123 and an abutment 238. At its lower end, the member 123 is formed to provide a hook 239 which engages a rod 240 to limit the upward movement of the carriage.

Figure 3:
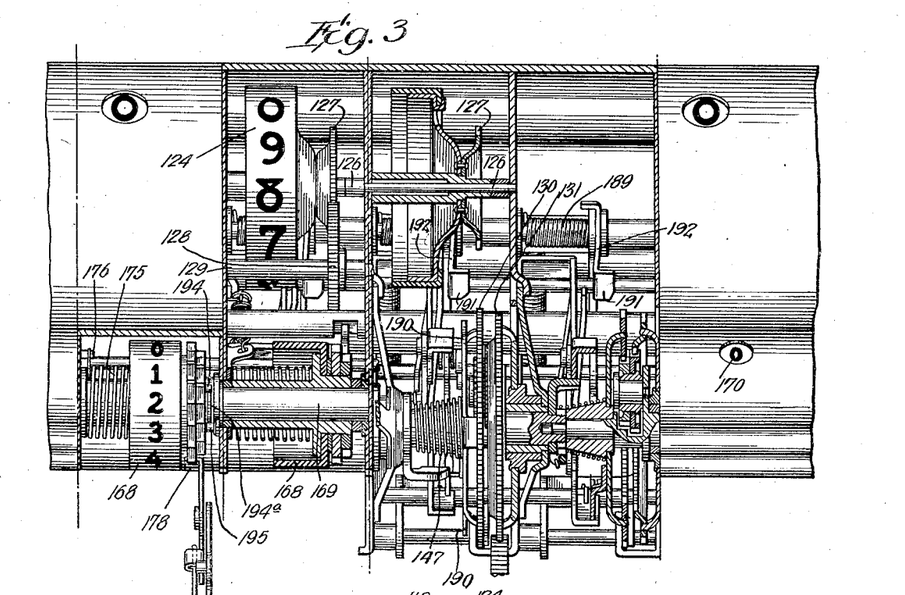
Fig. 3 is a composite sectional view taken transversely of the machine and showing the accumulator mechanism, the counter mechanism and various other parts.
Figure 4:
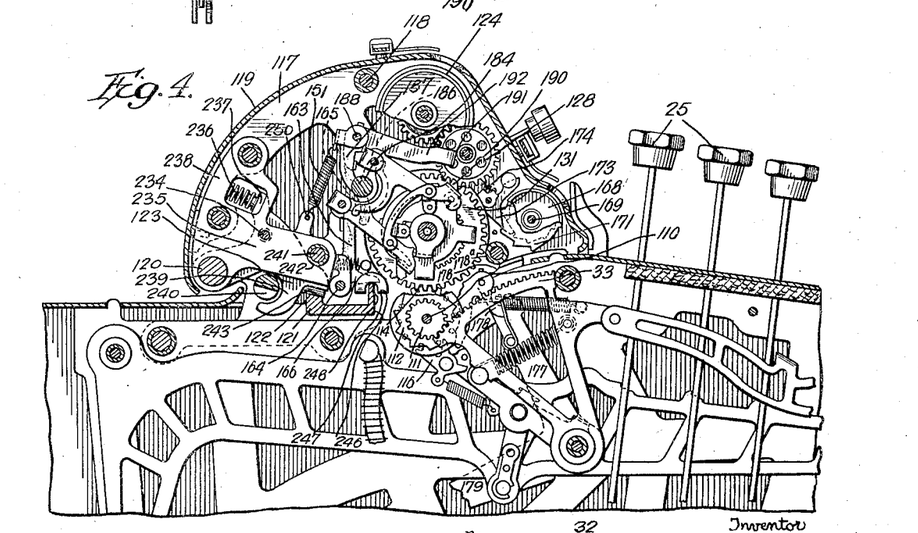
Fig. 4 is a sectional view taken on the line 4—4 of Fig. 1, through the rear of the machine showing a cross-section of the carriage.

When the carriage is shifted by mechanism hereinafter described, such shifting causes the tapered edge 243, of the lock arm 123 to ride out of the notch 122 on the inclined sides of said notch, and as the edge 243 is riding out of the notch it elevates the carriage to disentrain the accumulator mechanism from the actuating mechanism. The edge 243 continues to ride out until the edge rides on the top surface 121 of the bed-plate, on which such edge 243 then slides until it reaches a next notch 122. During the sliding of the edge 243 on the surface 121 the carriage is maintained elevated, so that the accumulator mechanism may clear the actuating mechanism, the bushing and rod 241 engaging the surface 242 of the lock arm 123, which thus supports the carriage in elevated position to clear the mechanism of the stationary part of the machine during the shifting of the carriage until the lock arm 123 reaches and enters a next notch 122, when the tapered edge slides off the top surface 121 of the bed plate onto the inclined surface of such notch, permitting the carriage to seat. Should the lock arm fail to seat completely within the notch, spring 236 forces the lock arm 123 downwardly so that the tapered edge is moved downwardly on said inclined sides of the notch 122 and thereby draws the carriage laterally and centers it and its accumulator mechanism, in proper alignment and engagement with the actuating mechanism. The housing plates 235, aforesaid, between which the arm 123 is secured and oscillates, serve to rigidly hold the arm in vertical position, and provide vertical faces against which the lateral pressure of the arm is positively exerted, to press the carriage laterally as the spring 236 forces said arm to rock downwardly into completely centered seating in the notch 122 that it has entered. The numeral wheels 124 for registering accumulation are each provided with the usual nine digits and with the zero mark, which may be viewed through sight openings 125 in the cover plate of the carriage. The numeral wheels of the respective orders of the accumulator mechanism are mounted to rotate on cross-rods or fixed supporting shafts 126 supported by the framework of the carriage and each numeral wheel is provided with its operating gear 127 in mesh with a gear 128 mounted on a parallel cross-rod 129. (Figs. 3 and 4.) Direct or indirect actuation is transmitted by the transmission gear mechanism of the accumulator to the gear 128 and the latter in turn transmits the accumulative motion to the gear 127 for rotating the numeral wheel in accordance with the incremental movement of either direct or indirect, or concurrently direct and indirect actuation.

The transmitting gear mechanism of the accumulator receives the actuation of the column actuators from the gears 114 of the internal ratchet mechanisms and transfers such actuation to the numeral wheels of the corresponding orders. It also embodies a carrying mechanism that employs the same gear transmission for effecting a carrying of the tens from lower orders to higher orders, whenever the numeral wheels of lower orders pass from "9" to "0". The carrying movement in the higher order may take place, in accordance with the mechanism of the invention, concurrently with a direct actuation of said higher order by its own corresponding column actuator without in any manner swallowing up the carrying impulse or entailing loss of carry. The accumulator mechanism of each order supported by the carriage comprises a pair of juxtapositioned combined internal and external gears 130 and 131, the external gear teeth 132 of gear 130 being in mesh with the gear 128 and the external teeth 133 of the right-hand gear 131 being in mesh with the gear 114 of the internal ratchet mechanism. The gear 131 is loosely journaled upon a stub shaft 134 supported by a skeleton plate of the carriage frame and the left-hand gear 130 is loosely journaled upon a short stub shaft 135 which passes through the hub 136 of gear 130, the hub 137 of gear 131, and is itself mounted for rotary movement in a socket 138 formed in the stationary stub shaft 134. The external teeth of gear 131 are differential with respect to the external teeth of gear 130, for example gear 131 may have thirty-six external teeth while gear 130 has forty external teeth. The internal teeth 139 of gear 131 are also differential with respect to the internal teeth 140 of gear 130, for example, gear 131 may have forty-four internal teeth 139 and gear 130 may have forty internal teeth 140. The short stub shaft 135 is concentric with the axis of rotation of the gears 130 and 131 and itself constitutes a carrier for a pair of differential epicyclic pinions 141 and 142, pinion 141 corresponding to gear 131 and meshing with its internal teeth 139 and pinion 142 corresponding with gear 130 and meshing with its internal teeth 140. The pair of differential pinions 141, 142, are fixed together and rotate about a common axis 143 that is eccentric to the axis of rotation 135 of gears 130 and 131. For example, pinion 141 may have twenty-two teeth and pinion 142 eighteen. Said pinions are journaled on the outer end of a carrier arm 144 fixedly supported by and projecting from shaft 135 in a direction transverse to its axis of rotation. The pair of differential epicyclic pinions 141, 142, constitutes the interposed transmitting gearing for transmitting direct actuation from the gear 114 of the internal ratchet mechanism to the numeral wheel gear 127 of the corresponding order. The transmission of direct incremental actuation may take place while the epicyclic pinions are moving only about their axis 143 and no epicyclic movement of said pinions about the axis 135 is taking place. In fact, this is the mode of operation except when a carry is being transferred from a lower order, but the carrying transfer which involves an epicyclic movement of the pair of pinions does not disturb the work of the pinions in transmitting direct actuation by rotation on axis 143. The transmission of direct actuation is as follows: On the up-stroke of the column actuator arm the internal ratchet mechanism gear 114 is rotated for a distance sufficient to move the numeral wheel the number of numeral spaces required by the key actuated or set. The movement of gear 114 is transmitted to external gear 133 which in turn rotates internal gear 139, internal gear 139 rotates the pair of differential pinions 141, 142, pinion 141 meshing with gear 139 and pinion 142 meshing with gear 140 to rotate the latter. The rotation of gear 140 also rotates external gear 130, thereby rotating gear 128 and the numeral wheel gear 127. The gearing just described is so proportioned that external gear 132 turns a half rotation during each complete rotation of the corresponding numeral wheel gear 127 and numeral wheel 124.

The epicyclic movement of the pair of differential pinions 141, 142, is employed to receive and impart to the combined internal and external gear 130 a further one-step movement when a carry is released by the next lower order of the machine, that is when the numeral wheel of the next lower order passes between "9" and zero. The left-hand face of each combined internal and external gear 130 is provided with gear arms 145 to a projecting stud 146 of which is secured one end of the carrying spring 147 which embraces the hub 136 of the gear 130. The other end of the carrying spring 147 is secured to a hook 148 (Fig. 7) projecting from a small disk 150 mounted on the right-hand end of and rigidly secured to the stub shaft 135 of the pair of differential pinions of the next higher order. The disk 150 constitutes an escapement wheel for the carrying transfer in the next higher order, whenever a carry is to go over from a lower order. The disk 150 is provided on its periphery with one carry-storage stop-lug 153 which is adapted to retain the escapement wheel 150 against rotation and the differential pistons 141, 142, of the higher order against epicyclic movement, by the co-operation of a pair of carry-storage-retaining latches 154. Each carry-storage retaining latch is mounted on a transverse rod 155 supported by the framework of the carriage, and the two latches 154 are connected together by a curved connecting link 156 which causes both of the latches to move simultaneously when either one is moved. Each latch is provided with a curve stop arm 158 each of which makes contact with the transverse rod 155 of the other member when its detent 157 is in engagement with stop lug 153. Projecting from the free end of each latch 154, is cam lug 161 which when engaged moves its latch 154 and detent 157 away from the stop lug 153 to release the escapement wheel 150, whenever a carry is to go over from the lower to the higher order. When said latch 154 is moved to release the escapement wheel 150 it pulls the connecting bar 156 which moves the other latch 154 into position so that its detent 157 is ready to engage the released stop lug 153. This movement occurs at each one-half revolution of the lower order gear 130, at the time when the numeral wheel of said lower order is passing between the "9" point and zero. Secured to said arms 145 of said gear 130 is a curved inside guard 244 that extends around for about one-half of the perimeter of said gear 130. One end of said guard is depressed at 245 and in front of the other end of the guard 244 is a dolly-roll 246. The dolly-roll and the depressed portion are positioned oppositely with respect to the gear 130, the dolly-roll being adapted to engage and move one or the other of the cam lugs 161, and its respective latch 154 whose detent 157 is in engagement with the stop lug 153 of the higher order, at the movement of carry release. When the external gear 130 moves its numeral wheel beyond the "9" point, the guard or cam presses outward the cam lug 161 that corresponds to the detent 157 that is in engagement with the stop lug 153, and this movement causes the connecting link 156 to move the opposite cam lug 161 down into the recess 245 to hold the other detent 157 in position to move into engagement with the stop lug 153 when the numeral wheel moves to zero. The contour of the recess in the guard 244 is designed to prevent the impact of the dolly-roll 246 from releasing the detent 157 too early, by offering resistance to the opposite latch that must move in as the engaged latch is disengaged. At the instant when the gear 130 has completed one-half revolution, i. e., moved its numeral wheel to zero, the dolly-roll moves the cam lug 161 whose detent 157 is holding the stop lug 153 to release the stop lug and effect a carry, and at the same instant the guard 244 moves from under the other cam lug 161, and said other detent's latch 154 is moved so that its detent 157 will catch the released stop lug 153. During direct actuation by its own column actuator the combined internal and external gear 130 of each lower order of the machine acts as a carrying spring winding gear for the purpose of winding the carrying spring 147 to impart a carry-producing impulse to the escapement wheel 150 of the higher order. The carrying spring 147 is wound during each one-half revolution of the gear 130 between the points of carrying release by the dolly-roll and the depressed portion of the inside guard. At the moment of carry release, the carrying spring 147 has power stored in it sufficiently to turn the escapement wheel 150 of the higher order, to which said carrying spring is also attached, and this effects an epicyclic movement of the pair of differential pinions 141, 142, of said higher order, by reason of the turning of the carrier 144. By such epicyclic movement of the pinions 141, 142, in the next higher order, because of the differential number of teeth in the pinions themselves and in the combined internal and external gears with which said pinions mesh and co-operate, the gear 130 of the higher order is imparted a movement sufficient to actuate the numeral wheel of said higher order one extra numeral space required by the carrying transfer.

As external gear 130 receives all accumulator actuation from pinion 142, and is not in mesh with gearing other than pinion 142, gear 128 and numeral wheel gear 127, it is free to take a carry over at all times and there is no delay in transmitting a carry from a lower order to a higher order until the higher order has finished its direct actuation. In fact the carry may complete itself before the direct actuation in the higher order has been completed. A carry will go over even though a key in such next higher order is held in its lowermost depressed position. Such mechanism permitting a carry to go over and complete the transfer from a lower order to a higher order regardless of the movement or position of the mechanism in the next higher order, greatly facilitates dual actuation of various orders simultaneously in either key-driven or key-set and universal-key-driven operation of the machine.

In key-driven actuation, for mere addition or subtraction, the carriage containing the accumulator mechanism is stationary relatively to the actuating mechanism throughout the performance of the entire example, preferably with the first order of the accumulator mechanism in operative engagement with the first order of the actuating mechanism. In multiple stroke key-set universal-key-driven calculation, or if desired in individual-key-driven multiple-stroke calculation it is or may be necessary, however, to shift the carriage from order to order of the machine in order to effect the accumulation of the multiple strokes represented by each digit of one factor. For example, in performing multiplication, a multiple place factor, such as the multiplicand, would be set up by the keys 25. If the multiplier is also multiple place, the carriage may be set first, with the units order of the carriage corresponding with the units order of the actuating mechanism, and the universal-key 56 would be depressed for a number of times corresponding to the digital value of the units place of the multiplier. After this is accomplished, the carriage is shifted and the universal-key then depressed for a number of times corresponding with the tens place of the multiplier, and so on until each ordinal digit of the multiplier is exhausted. The operation of the machine is, however, not confined to multiplying from right to left, as multiplication may be performed by starting from the left, in which case the carriage would be positioned accordingly. For shifting the carriage, there are provided at its opposite ends handles 162 so that the carriage may be first swung upwardly on its supporting rod 120 and then shifted transversely of the stationary casing of the machine, as required or may be shifted by mechanism to be hereinafter described.

The operation of lifting the carriage disengages the gears 131 of the ordinal accumulator mechanism from the gears 114 of the ordinal actuating mechanism, and this would, unless prevented, release the tension of the carrying springs 147 which are attached to the gears 130. In order to prevent the carrying springs from unwinding reversely and losing their tension, there is provided in each order of the accumulator mechanism a locking lever 163 (see Fig. 4) for locking the gears 130 against movement, whenever the respective gear trains are disengaged from the actuating mechanism. The locks 163 are pivoted at their lower ends on a rod 164 secured to the several plates of the carriage frame and the upper ends of said lock levers are provided with detents 165 adapted to move into engagement with the external teeth of the gears 131, when the locks 163 are released by the lifting of the carriage. The said lock levers 163 are provided with horizontal arms 166 which engage a ledge of the bar 121 to throw the detents out of engagement with such gears as are to be engaged with the actuating mechanisms, when the carriage frame is in its lowered position. Said arms 166 are arranged between a frame plate and a folded portion 246—247 thereof, forming a guard against accidental release of the lock lever by an operator or anyone else who may by accident grasp the projecting portion of the carriage to lift the machine. Said portion is provided with a slot 248 so that said guard may fit over the ledge of the bar 121. These slotted portions are provided to limit the throw of said arms 166 when they are lowered onto said ledge. When, however, the carriage is lifted springs 167 connecting the vertical arms of the levers 163 with the rod 249 are released to pull the detents 165 of said levers forwardly into locking engagement with the gears 131. As the gears 130 are not locked, even in those orders of the accumulator in which locks 163 have not been released by engagement with bar 121, the carrying transfers may nevertheless take place although such orders may not be in operative position with respect to any part of the actuating mechanism.

The invention provides a counter mechanism for registering the universal-key actuation in multiple stroke calculation, for each order of one factor of the example, for instance, the multiplier. There is provided in a series of orders of the carriage beginning with the units order a counter wheel 168 (Figs. 5 and 3) having on its face the nine digits and the "0" mark, the several counter wheels being mounted on shafts 169 supported by the upright plates of the carriage frame. The registrations of the several counter wheels are viewed through sight openings 170 in the casing plate of the carriage and located forwardly of the sight openings of the accumulator registering wheels. Each counter wheel is provided with a pair of ratchets 171 and 172, (see Figs. 5 and 6) the ratchet 171 being the driving ratchet for said wheel and the ratchet 172 the retaining ratchet for preventing backward rotation thereof. A pivoted pawl 173 impelled by a spring 174 engages the teeth of the retaining ratchet 172 for preventing backward rotation of the counter wheel 168. Each counter wheel 168 is provided with a spring 175 (see Fig. 3) encircling its hub and having one end secured to the wheel and the other at 176 to the carriage frame plate, for turning the wheel backwardly to zero, in zeroizing, as will be hereinafter explained. For actuating the counter wheel successively, (see Fig. 5) there is provided in the units order of the actuating mechanism a bell crank lever 177 at the upper end of the vertical arm of which is pivoted a tooth-engaging member 178 adapted to engage the teeth of the ratchet 171. The horizontal arm 179 of the bell crank lever carries at its rear end a dolly-roll 179a which rides on the cam 180 of an actuator plate 41 secured to the oscillatory shaft 40 of the universal actuator 39. The cam 180 lifts the arm 179 of the bell crank lever during each complete downward oscillation of the shaft 40 (counter-clockwise viewing Fig. 5). As the arm 179 rises the member 178 moves upward in a clockwise direction to advance the ratchet of the counter wheel one numeral space. As the universal-actuator makes its upward oscillation to effect the actual transfer of incremental ordinal accumulation to the accumulator, (the adding actuation), the cam 180 allows the bell crank arm 179 to be swung downwardly by the spring 177a, so that the member 178 is then out of engagement with the teeth of ratchet 171. The member 178 in its normal position engages the bar 178a and does not engage the teeth but only makes contact with the ratchet when the universal actuator key 56 is in its lowered position. These operations take place successively on the counter wheels as the carriage is shifted in multiple stroke actuation.

Figures 5, 6, 7, 8:
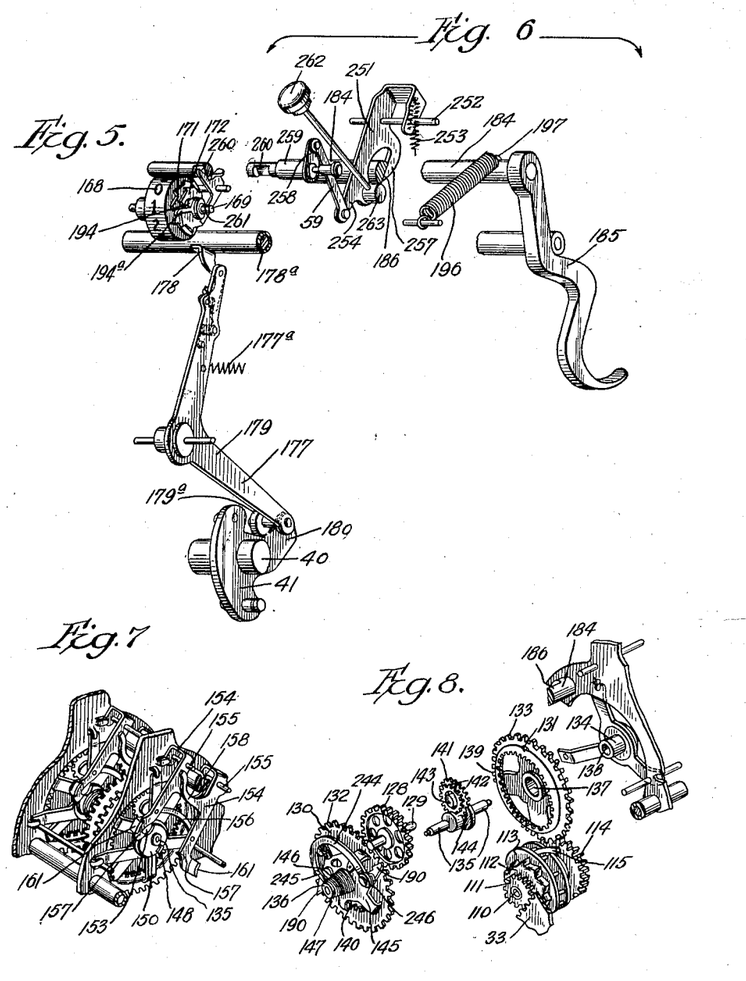
Fig. 5 is a perspective view illustrating part of the counter driving mechanism.
Fig. 6 is a perspective view illustrating the right-hand portion of the counter zeroizing mechanism.
Fig. 7 is a perspective view illustrating the accumulator mechanism.
Fig. 8 is a detached perspective view illustrating the accumulator mechanism in more detail.

Zeroizing mechanism is provided for restoring to zero the several orders of the accumulator mechanism and also the several orders of the counter mechanism. A zeroizing shaft 184 extends transversely through the framework of the carriage and is provided at its right-hand end with a zeroizing handle 185 (see Figs. 6 and 9) by which the shaft may be turned back and forth. The handle 185 extends beneath the cover of the carriage and in zeroizing may be pulled forwardly toward the carriage shift handle 162, as indicated by the dot-and-dash lines in Fig. 9. Zeroizing shaft 184 is provided with ordinal notches 186 (see Figs. 6 and 4) within which seat the depending zeroizing release and stop levers 187 corresponding to the several orders of the accumulator mechanism. These levers are pivoted at their upper ends on a rod 188 supported by the framework of the carriage and are retained in their normal positions by the springs 151 connected with the carriage frame at 250. The lower ends of said zeroizing release and stop levers project into the path of movement of the lock levers 163, and when said release levers 187 are moved rearwardly toward the left, as viewed in Fig. 4, their motion is transmitted to the lock levers 163 to push the locking detents away from engagement with the gears 131 of the accumulator trains and to release the carrying springs 147. This motion occurs whenever the carriage has been lifted and the zeroizing lever 185 concurrently pulled forward to turn the shaft 186 so that the levers 187 are forced rearwardly by the engagement of the edges of the recesses in said shaft. Inasmuch as the gears 130 and 131 are released by disengagement of gears 131 from the gears 114 the carrying springs 147 are free to turn gears 130 and with them through the other transmitting gearing all the numeral wheels backwardly to the zero point. When the numeral wheels of the accumulator mechanism have arrived at zero, the reverse rotation imparted by the released carrying springs 147 is arrested to retain the numeral wheels in zero positions by means of zero stops 190 provided at diametrically opposite positions on the respective gears 130 (Figs. 4 and 8). One or the other of these stops 190 is engaged by a stop detent 191 mounted at the end of the zeroizing stop lever 192, whenever the gear 130 has been turned so that its corresponding numeral wheel 124 is at zero. The zeroizing stop levers are pivoted at their upper ends on the shaft 188 and are connected by springs 189 (Figs. 3 and 4) with the release levers 187 to form flexible bell-cranks. The lower ends of the stop levers are moved downwardly to position the stop detents 191 in the path of the stops 190, whenever the zeroizing shaft 184 is turned. A spring 196 fastened to a hook 197 (see Fig. 6) formed by hollow milling of the shaft, winds around the shaft 184 when turned in a zeroizing operation and restores the shaft and its operating handle 185 to normal.

Zeroizing of the counter wheels 168 may be effected, as disclosed in the present embodiment, concurrently with zeroizing of the accumulator wheels 124. For this purpose, a zeroizing lever 251 is mounted on a transverse rod 252 supported by the framework of the carriage and is provided with a spring 253 normally holding its forward lower end 254 in forward position as shown in Figure 6. The lever 251 has a depending arm 257 engaging a recess 186 of the zeroizing rod 184. At its forward lower end, the lever 251 is pivoted to a link 59 which is in turn pivoted at its other end to an oscillatory arm 258 secured to a counter zeroizing shaft 259. The shaft 259 is also provided with ordinal notches 260 within which seat the upwardly extending arm 261 of the spring impelled pivoted pawl 173 that engages the teeth of the retaining ratchet 172 for preventing backward rotation of the counter wheels. Operation of the zeroizing lever 185 for zeroizing, causes the zeroizing lever 251 to move rearwardly which pulls the link and oscillatory member to the rear which causes the counter zeroizing shaft to move in a clockwise direction and force the arms 261 downwardly and consequently the backstop pawls 173 downwardly against the tension of their springs so that pawls 173 are disengaged from the teeth of ratchet 172 and the counter wheels may then turn rearwardly to zero under the action of their zeroizing springs 175 (Fig. 3). When it is desired to zeroize the counter wheels without zeroizing the numeral wheels of the accumulator mechanism, depression of a key 262 whose stem is fixed in a stud 263 pivotally mounted on the zeroizing lever 251 will effect the zeroizing of counter wheels independently of the zeroizing shaft 184.

When the respective counter wheels have arrived at zero positions, their backward rotation is arrested by the zero stop pin 194 (see Figs. 3 and 5) on the ratchet 172 coming to a stop against an arm 194a loosely mounted on the hub of the counter wheel and which in turn engages a fixed stop 195, fastened to the frame of the carriage. The loose arm 194a serves as a yielding feature of the stop device on forward rotation, which may lift and not obstruct passage as the pin 194 engages it, when the counter wheel moves forwardly to the "9" position, the pin 194 being positioned nearer to the axis of shaft 169 than pin 195 to prevent interference with the full movement of the counter-wheel pin 194, the space occupied by pin 194—195 being greater than a one step movement of the counter wheel or the space between "9" and zero, and making such combination necessary.

The invention is hereinabove set forth as embodied in a particular form of construction but may be variously embodied within the scope of the claims hereinafter made.

I claim:

1. In a calculating machine having a liftable carriage liftable relative to stationary ordinal actuating mechanism, said carriage supporting and lifting with it a series of ordinal accumulator mechanisms liftable out of engagement with the actuating mechanisms, said accumulator mechanisms including means comprising ordinal carry storage springs for storing power for effecting carrying of tens and adapted when the accumulator is lifted out of engagement with the actuating mechanism to turn the accumulators backward to zero under the carrying power stored in the carrying springs, zeroizing prevention means movable into engagement with said accumulator mechanisms upon lifting of the carriage to prevent such backward turning, said zeroizing prevention means being shiftable out of such engagement by contact with a part of the stationary portion of the machine upon seating of the carriage on stationary parts of the machine, counter wheels carried by said carriage for registering the number of strokes of the actuating mechanism and having spring means for storage of power by the registering action of the counter wheels for effecting their zeroizing, counter release means for releasing said counter wheels for zeroizing under the power stored in their springs, a universal zeroizing means adapted when operated concurrently with lifting of the carriage to restrain the zeroizing prevention means for effecting zeroizing of the accumulator mechanism and concurrently operate the counter release means, and optionally operable means comprising parts of the universal zeroizing means arranged for separate movement freely relative to the remaining parts of the universal zeroizing means for separately operating the counter release means while the carriage is in its seated position.

2. In a calculating machine having a liftable carriage liftable relative to stationary ordinal actuating mechanism, said carriage supporting and lifting with it a series of ordinal accumulator mechanisms liftable out of engagement with the actuating mechanism, said accumulator mechanisms including means comprising ordinal carry storage springs for storing power for effecting carrying of tens and adapted when the accumulator is lifted out of engagement with the actuating mechanism to turn the accumulators backward to zero under the carrying power stored in the carrying springs, zeroizing prevention means movable into engagement with said accumulator mechanisms upon lifting of the carriage to prevent such backward turning, said zeroizing prevention means being shiftable out of such engagement by contact with the stationary part of the machine upon seating of the carriage on said stationary part, a universal zeroizing means adapted when operated concurrently with lifting the carriage to restrain the zeroizing prevention means to effect the zeroizing of the accumulator mechanism.

3. A calculating machine comprising ordinal column actuators, a liftable carriage shiftable from order to order for multiple place actuation, said carriage supporting for shifting with it ordinal accumulator mechanisms including means for storing power for effecting carrying of the tens from column actuators in any ordinal position of the carriage, zerozing prevention means for preventing the accumulator mechanism from being returned to zero by said means for storing power, counter wheels carried by the carriage for registering the number of actuations of the column actuators and having counter return means for returning the counter wheels to zero, a universal zeroizing means adapted when operated concurrently with lifting of the carriage to restrain the zeroizing prevention means for effecting zeroizing of the accumulator mechanism and concurrently operate the counter return means, and optionally operable means comprising parts of the universal zerozing means arranged for separate movement freely relative to the remaining parts of the universal zeroizing means for separately operating the counter release means while the carriage is in its seated position.

JOSEPH A. V. TURCK.